US012659366B2

(12) United States Patent
Su et al.

(10) Patent No.: US 12,659,366 B2
(45) **Date of Patent: *Jun. 16, 2026**

(54) METHODS, SYSTEMS, AND MEDIA FOR SELECTING VIDEO FORMATS FOR ADAPTIVE VIDEO STREAMING

(71) Applicant: Google LLC, Mountain View, CA (US)

(72) Inventors: Yeping Su, Cupertino, CA (US); Balu Adsumilli, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,306

(22) Filed: Feb. 5, 2024

(65) Prior Publication Data

US 2024/0214443 A1      Jun. 27, 2024

Related U.S. Application Data

(63) Continuation of application No. 17/980,031, filed on Nov. 3, 2022, now Pat. No. 11,895,176, which is a
(Continued)

(51) Int. Cl.
*H04N 7/173*          (2011.01)
*H04L 65/612*          (2022.01)
(Continued)

(52) U.S. Cl.
CPC ............ *H04L 65/80* (2013.01); *H04L 65/612* (2022.05); *H04L 65/752* (2022.05); *H04L 67/12* (2013.01);
(Continued)

(58) Field of Classification Search
CPC ......... H04L 65/80; H04L 65/75; H04L 67/61; H04L 65/612; H04L 65/752;
(Continued)

(56) References Cited

U.S. PATENT DOCUMENTS 9,826,016 B2    11/2017 Petrangeli et al.
10,447,926 B1    10/2019 Brailovskiy et al.
(Continued)

OTHER PUBLICATIONS

Examination Report issued in IN Application No. 202044038494 dated Nov. 26, 2021, 7 pages.
(Continued)

*Primary Examiner* — Annan Q Shang
(74) *Attorney, Agent, or Firm* — Lowenstein Sandler LLP

(57)          ABSTRACT

A method is provided that may include receiving, at a server, an indication of a first video to be presented on a user device, determining, at the server based on video features of the first video, a group of predicted viewership scores for each format from a group of available formats for the first video, selecting, at the server, a first format for the first video based on the group of predicted viewership scores for the first video, causing the first video to be presented on the user device, identifying a quality of a network connection between the user device and the server that hosts the first video during the presentation of the first video on the user device, receiving an indication of a second video to be presented on the user device, identifying a change in the quality of the network connection between the user device and the server, determining whether a format of the second video is to be changed from the first format to a second format based at least in part on the change in the quality of the network connection between the user device and the server, and in response to determining that the format of the second video is not to be changed from the first format to the second format, causing the second video to be presented by the user device.

20 Claims, 5 Drawing Sheets

Related U.S. Application Data continuation of application No. 16/835,587, filed on Mar. 31, 2020, now Pat. No. 11,503,099.

(51) Int. Cl.

| | |
|---|---|
| *H04L 65/752* | (2022.01) |
| *H04L 65/80* | (2022.01) |
| *H04L 67/12* | (2022.01) |
| *H04N 7/01* | (2006.01) |
| *H04N 21/442* | (2011.01) |
| *H04L 67/61* | (2022.01) |

(52) U.S. Cl.
CPC ............. *H04N 7/01* (2013.01); *H04N 21/442* (2013.01); *H04L 67/61* (2022.05)

(58) Field of Classification Search
CPC ..... H04L 65/762; H04L 67/12; H04L 67/565; H04N 7/01; H04N 21/442; H04N 21/26258; H04N 21/44209; H04N 21/4516; H04N 21/4662; H04N 21/6581; H04N 21/8456
See application file for complete search history.

(56) References Cited

U.S. PATENT DOCUMENTS

| | | | |
|---|---|---|---|
| 2013/0057705 A1* | 3/2013 | Parker | H04N 21/64723 |
| | | | 348/184 |
| 2013/0198767 A1* | 8/2013 | Wang | H04N 21/6583 |
| | | | 725/14 |
| 2013/0329781 A1 | 12/2013 | Su et al. | |
| 2014/0068438 A1 | 3/2014 | Hillebrandt | |
| 2014/0241415 A1* | 8/2014 | Su | H04N 21/23424 |
| | | | 375/240.02 |
| 2014/0372591 A1* | 12/2014 | Payette | H04L 47/762 |
| | | | 709/223 |
| 2015/0049821 A1 | 2/2015 | Chen et al. | |
| 2015/0089026 A1* | 3/2015 | Payette | H04L 67/141 |
| | | | 709/219 |
| 2015/0326896 A1 | 11/2015 | Su et al. | |
| 2015/0346812 A1 | 12/2015 | Cole et al. | |
| 2015/0365729 A1* | 12/2015 | Kaya | H04N 21/6582 |
| | | | 725/14 |
| 2016/0073106 A1* | 3/2016 | Su | H04N 21/8456 |
| | | | 375/240.02 |
| 2016/0269680 A1 | 9/2016 | Manley et al. | |
| 2016/0360180 A1 | 12/2016 | Cole et al. | |
| 2017/0140285 A1* | 5/2017 | Dotan-Cohen | G06F 9/453 |
| 2017/0339415 A1 | 11/2017 | Wang et al. | |
| 2017/0359580 A1 | 12/2017 | Su et al. | |
| 2019/0104326 A1 | 4/2019 | Stockhammer et al. | |
| 2019/0289296 A1 | 9/2019 | Kottke et al. | |
| 2019/0289926 A1 | 9/2019 | Abbaszadeh | |
| 2020/0267384 A1 | 8/2020 | Doron | |
| 2021/0021806 A1 | 1/2021 | He et al. | |

OTHER PUBLICATIONS

Final Office Action for U.S. Appl. No. 16/835,587, mailed Feb. 17, 2022, 14 Pages.

Final Office Action for U.S. Appl. No. 16/835,587, mailed Apr. 29, 2021, 12 Pages.

Non-Final Office Action for U.S. Appl. No. 16/835,587, mailed Nov. 5, 2021, 13 Pages.

Non-Final Office Action for U.S. Appl. No. 16/835,587, mailed Jan. 7, 2021, 8 Pages.

Notice of Allowance for U.S. Appl. No. 16/835,587, mailed Jul. 13, 2022, 7 Pages.

\* cited by examiner

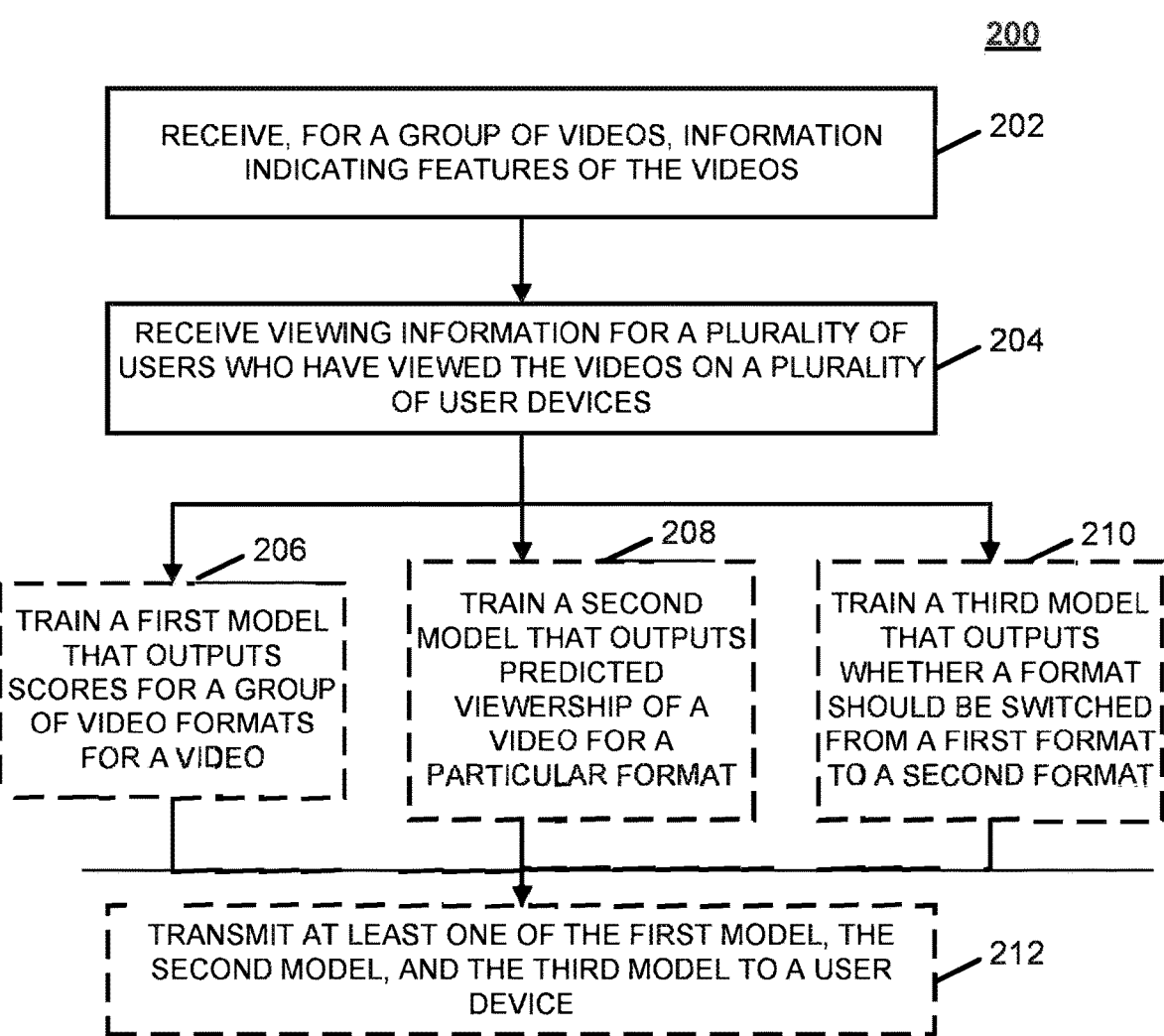

200

RECEIVE, FOR A GROUP OF VIDEOS, INFORMATION INDICATING FEATURES OF THE VIDEOS — 202

RECEIVE VIEWING INFORMATION FOR A PLURALITY OF USERS WHO HAVE VIEWED THE VIDEOS ON A PLURALITY OF USER DEVICES — 204

206
TRAIN A FIRST MODEL THAT OUTPUTS SCORES FOR A GROUP OF VIDEO FORMATS FOR A VIDEO

208
TRAIN A SECOND MODEL THAT OUTPUTS PREDICTED VIEWERSHIP OF A VIDEO FOR A PARTICULAR FORMAT

210
TRAIN A THIRD MODEL THAT OUTPUTS WHETHER A FORMAT SHOULD BE SWITCHED FROM A FIRST FORMAT TO A SECOND FORMAT

TRANSMIT AT LEAST ONE OF THE FIRST MODEL, THE SECOND MODEL, AND THE THIRD MODEL TO A USER DEVICE — 212

FIG. 2

METHODS, SYSTEMS, AND MEDIA FOR SELECTING VIDEO FORMATS FOR ADAPTIVE VIDEO STREAMING

CROSS-REFERENCE TO RELATED APPLICATION

This application is a continuation of U.S. patent application Ser. No. 17/980,031, filed Nov. 3, 2022, which is a continuation of U.S. patent application Ser. No. 16/835,587, filed Mar. 31, 2020, now U.S. Pat. No. 11,503,099, each of which is incorporated herein by reference.

TECHNICAL FIELD

The disclosed subject matter relates to methods, systems, and media for selecting video formats for adaptive video streaming.

BACKGROUND

Users frequently stream video content items (e.g., television shows, videos, movies, music videos, etc.) on user devices from servers that host the video content items. In many cases, video content is streamed by a user device using adaptive bitrate streaming. For example, a user device can request a particular format, such as a particular resolution, for a video content item based on network information (e.g., a bandwidth of a network connection, a latency of the network connection, etc.). Continuing further with this example, the user device can switch between formats during presentation of the video content item as a network connection between the user device and the server changes. As a more particular example, in an instance in which the network connection becomes poorer during streaming of a particular video content item, the user device can request that the server transmit the video content item with a relatively lower resolution or with a relatively lower bitrate, thereby preventing a pause in presentation of the video content item on the user device to allow the user device to buffer the video content item.

However, switching video content item formats during presentation of a video content item can be resource-intensive. For example, choosing a higher bitrate or a higher resolution can incur a higher cost for a delivery infrastructure that is streaming the video content item. As another example, choosing a higher bitrate or a higher resolution can, in instances in which a video content item is streamed using a cellular data connection, incur a higher cost for a user device by using more cellular data. Additionally, switching between formats during presentation of a video content item can produce a choppy experience for a viewer. Moreover, it can be difficult to evaluate tradeoffs between the required resources for switching formats, a change in quality for a viewer, and/or a potential impact of changing a bitrate.

Accordingly, it is desirable to provide new methods, systems, and media for selecting video formats for adaptive video streaming.

SUMMARY

Methods, systems, and media for selecting video formats for adaptive video streaming are provided.

In accordance with some embodiments of the disclosed subject matter, a method for selecting video formats for adaptive video streaming, the method comprising: receiving an indication of a video to be presented on a user device; identifying a group of quality metrics for each of a plurality of segments of the video, wherein each quality metric includes values for a particular segment and for a particular format of a group of available formats for the video; selecting a first format for a first segment of the video; causing the first segment of the video to be presented on the user device; identifying a quality of a network connection between the user device and a server that hosts the video; identifying a second format for a second segment of the video based on the quality of the network connection; determining whether a format of the video is to be changed from the first format to the second format based at least on the group of quality metrics for the second segment of the video; and, in response to determining that the format of the video is to be changed from the first format to the second format, causing the second segment having the second format to be presented by the user device.

In some embodiments, the group of quality metrics includes data from a sensor used to capture the video, and determining whether the format of the video is to be changed from the first format to the second format is based on the data from the sensor of the camera. In some embodiments, the data from the sensor includes motion information that indicates positioning of the camera during capture of a corresponding segment of the video.

In some embodiments, the group of quality metrics includes analysis data from processing of the video after capture of the video. In some embodiments, the analysis data includes activity information associated with content included in a corresponding segment of the video.

In some embodiments, at least one quality metric in the group of quality metrics includes Just Noticeable Difference (JND) scores that indicate a minimum difference in a value of the quality metric from the first segment of the video to the second segment of the video that is perceptible to a viewer of the video. In some embodiments, determining that the format of the video is to be changed from the first format to the second format is based on JND scores for the first format and the second format.

In some embodiments, determining that the format of the video is to be changed from the first format to the second format comprises is based on a trained model that takes the group of quality metrics and the quality of the network connection as inputs and generates an output indicating that the format of the video is to be changed.

In accordance with some embodiments of the disclosed subject matter, a system for selecting video formats for adaptive video streaming is provided, the system comprising a hardware processor that is configured to: receive an indication of a video to be presented on a user device; identify a group of quality metrics for each of a plurality of segments of the video, wherein each quality metric includes values for a particular segment and for a particular format of a group of available formats for the video; select a first format for a first segment of the video; cause the first segment of the video to be presented on the user device; identify a quality of a network connection between the user device and a server that hosts the video; identify a second format for a second segment of the video based on the quality of the network connection; determine whether a format of the video is to be changed from the first format to the second format based at least on the group of quality metrics for the second segment of the video; and, in response to determining that the format of the video is to be changed from the first format to the second format, cause the second segment having the second format to be presented by the user device.

In accordance with some embodiments of the disclosed subject matter, a non-transitory computer-readable medium containing computer executable instructions that, when executed by a processor, cause the processor to perform a method for selecting video formats for adaptive video streaming is provided, the method comprising: receiving an indication of a video to be presented on a user device; identifying a group of quality metrics for each of a plurality of segments of the video, wherein each quality metric includes values for a particular segment and for a particular format of a group of available formats for the video; selecting a first format for a first segment of the video; causing the first segment of the video, having the first format, to be presented on the user device; identifying a quality of a network connection between the user device and a server that hosts the video; identifying a second format for a second segment of the video based on the quality of the network connection; determining whether a format of the video is to be changed from the first format to the second format based at least on the group of quality metrics for the second segment of the video; and, in response to determining that the format of the video is to be changed from the first format to the second format, causing the second segment having the second format to be presented by the user device.

In accordance with some embodiments of the disclosed subject matter, a system for selecting video formats for adaptive video streaming, the system comprising: means for receiving an indication of a video to be presented on a user device; means for identifying a group of quality metrics for each of a plurality of segments of the video, wherein each quality metric includes values for a particular segment and for a particular format of a group of available formats for the video; means for selecting a first format for a first segment of the video; means for causing the first segment of the video, having the first format, to be presented on the user device; means for identifying a quality of a network connection between the user device and a server that hosts the video; means for identifying a second format for a second segment of the video based on the quality of the network connection; means for determining whether a format of the video is to be changed from the first format to the second format based at least on the group of quality metrics for the second segment of the video; and means for causing the second segment having the second format to be presented by the user device in response to determining that the format of the video is to be changed from the first format to the second format.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 2 shows an illustrative example of a process for training models for selecting video formats for adaptive video streaming in accordance with some embodiments of the disclosed subject matter.

DETAILED DESCRIPTION

Figure 1:
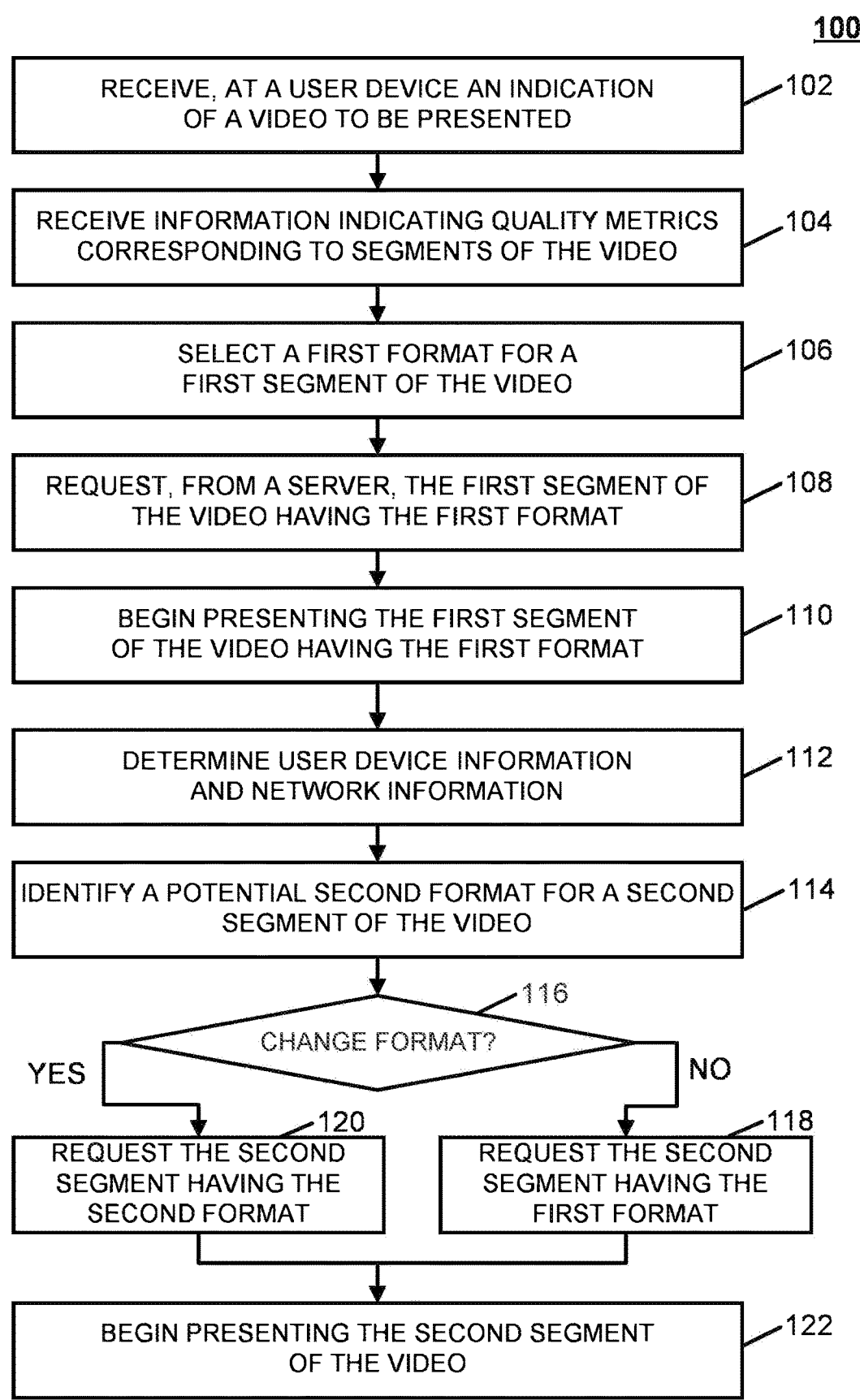
FIG. 1 shows an illustrative example of a process for selecting video formats for adaptive video streaming that can be implemented by a user device streaming a video content item in accordance with some embodiments of the disclosed subject matter.

In accordance with various embodiments, mechanisms (which can include methods, systems, and media) for selecting video formats for adaptive video streaming are provided.

In accordance with some embodiments, the mechanisms described herein can identify, for a particular video, video quality metrics indicating video quality for different segments of the video for different available formats of the video. In some embodiments, a user device can begin streaming the video from a server by receiving and presenting a first segment of the video having a first format from the available formats. In some embodiments, the user device can then determine network information that indicates a quality of the network connection between the user device and the server. In some embodiments, the mechanisms can identify a potential second format for a second segment of the video from the different available formats of the video based on the network information. In some embodiments, the mechanisms can then determine whether the format is to be changed from the first format to the identified potential second format. In some embodiments, in an instance in which the mechanisms determine that the format is to be switched to the identified potential second format, the user device can present the second segment with the identified second format. Conversely, in an instance in which the mechanisms determine that the format is not to be switched to the identified potential second format, the user device can present the second segment having the first format.

In some embodiments, the mechanisms can determine whether a format is to be changed from a first format to a potential second format based on any suitable information, such as a difference in the video quality metrics of the first format and the potential second format between the first segment and the second segment. For example, in some embodiments, the mechanisms can determine whether a difference in any suitable video quality metrics of the first format and the potential second format between the first segment and the second segment exceeds a Just Noticeable Difference (JND) for the video quality metrics. As a more particular example, in an instance in which a difference in a particular video quality Metric A for a first format and the potential second format between the first segment and the second segment is 0.1, and in which the JND for Metric A is 0.2, the mechanisms can determine that the format is not to be switched to the potential second format, because the difference between the first format and the potential second format is less than the JND. Conversely, in an instance in which the difference in Metric A for the first format and the potential second format between the first segment and the second segment is 0.3, and in which the JND for Metric A is 0.2, the mechanisms can determine that the format is to be switched to the potential second format, because the difference between the first format and the potential second format exceeds the JND.

In some embodiments, the mechanisms can identify a potential second format in any suitable manner. For example, in some embodiments, the mechanisms can identify a potential second format by predicting quality scores for each of a group of available formats using a trained machine learning model and can select the potential second format based on the generated quality scores. Additionally or alternatively, in some embodiments, the mechanisms can determine whether a format of the video is to be switched from a current first format to a potential second format using a trained machine learning model.

In some embodiments, the group of video quality metrics can include any suitable video quality information. For example, as described below in more detail in connection with FIGS. 1 and 5, the video quality metrics can include any suitable full reference or no reference video quality metric, sensor data from a camera that captured the video (e.g., that indicates motion of the camera during capture of a corresponding segment of the video), analysis data generated during processing of the video (e.g., that indicates motion information of scenes of a corresponding segment of the video, that indicates color and/or contrast information of a corresponding segment of the video, that indicates scene or object information of a corresponding segment of the video, and/or any other suitable analysis data), and/or any other suitable video quality information.

Note that, in some embodiments, any suitable device can determine whether a format of a video content item being streamed is to be switched from a first format to a second format. For example, as shown in and described below in connection with FIG. 1, in some embodiments, a user device that is streaming the video content item can receive a first segment of a video content item having a first format in connection with a group of quality metrics for the video content item. Continuing with this example, in some embodiments, the user device can identify a potential second format and can determine whether a second segment of the video content item is to be switched to the potential second format based on the group of quality metrics for the video content item. Continuing further with this example, in some embodiments, the user device can request the second segment of the video content item having the second format in an instance in which the user device determines that the format is to be switched to the second format, or, conversely, can request the second segment of the video content item having the first format in an instance in which the user device determines that the format is not to be switched to the second format.

As another example, as shown in and described below in connection with FIG. 5, in some embodiments, a server that is streaming the video content item to a user device can determine whether a format is to be switched from a first format to the second format based on video quality metrics associated with the video content item, device information associated with a user device streaming the video content item, and/or network information associated with the user device. As a more particular example, in some embodiments, the server can receive, from the user device, user device information and/or network information, and can determine based on the user device information, the network information, and/or the video quality metrics, whether the format is to be switched from a first format to a second format. Continuing with this particular example, in an instance in which the server determines that the format is to be switched to the second format, the server can transmit a second segment of the video content item having the second format, or, conversely, in an instance in which the server determines that the format is not to be switched to the second format, the server can transmit the second segment of the video content item having the first format.

Turning to FIG. 1, an illustrative example 100 of a process for selecting video formats for adaptive video streaming is shown in accordance with some embodiments of the disclosed subject matter. In some embodiments, blocks of process 100 can be executed by any suitable device. For example, in some embodiments, blocks of process 100 can be executed by a user device (e.g., a mobile phone, a tablet computer, a laptop computer, a desktop computer, a wearable computer, a streaming media device, a smart television, a game console, a vehicle entertainment system, and/or any other suitable user device) that streams video content from a server. Note that, in some embodiments, blocks of process 100 can be performed by an application for streaming and presenting video content (e.g., an application associated with a particular video content service, and/or any other suitable application) that is executing on the user device.

Process 100 can begin at 102 by receiving, at a user device, an indication of a video to be presented. In some embodiments, the indication can be received in any suitable manner. For example, in some embodiments, a link or an icon that represents the video can be selected from a page that indicates available video content items (e.g., a homepage of a video content service, a page that shows recommendations personalized to a user of the user device, and/or any other suitable page). Note that, in some embodiments, the indication can be received by a user device that is paired with a display device that is to be used to present the video. For example, in some embodiments, the indication can be received by a mobile phone or a virtual assistant device that is paired with or otherwise associated with a television.

At 104, process 100 can receive information indicating quality metrics corresponding to segments of the video. In some embodiments, process 100 can receive the information indicating quality metrics corresponding to the segments of the video from a server that hosts the video. In some embodiments, process 100 can receive the information in response to transmitting an indication of the selected video to the server.

In some embodiments, the quality metrics can indicate any suitable information. For example, in some embodiments, the quality metrics can include any suitable full reference or no reference metrics that indicate video quality, such as Peak Signal-to-Noise Ratio (PSNR), structural similarity (SSIM), Video Multimethod Assessment Fusion (VMAF), and/or any other suitable video quality metric(s).

As another example, in some embodiments, the quality metrics can indicate metadata associated with the video associated with capture or editing of the video. As a more particular example, in some embodiments, the metadata can indicate equipment or software used to capture or edit the video, such as a model or type of camera used to capture the video, a name or version number of software used to edit the video, and/or any other suitable type of equipment or software information. As another more particular example, in some embodiments, the metadata can indicate motion information associated with the camera during capture of the video, such as gyroscope data from the camera during capture of the video, accelerometer data from an accelerometer of the camera during capture of the video, Global Positioning System (GPS) information associated with the camera during capture of the video, and/or any other suitable information that indicates motion of the camera during capture of the video. As yet another more particular example, in some embodiments, the metadata can indicate information generated from an analysis of the video after it has been captured. As a specific example, in some embodiments, the analysis metadata can indicate motion information (e.g., motion vector information, spatial activity, temporal activity, and/or any other suitable motion information determined as part of a post-capture analysis of the video). As another specific example, in some embodiments, the analysis metadata can indicate scene information (e.g., indications of detected objects, whether a particular scene includes faces or people, and/or any other suitable scene information). As yet another specific example, in some embodiments, the analysis metadata can indicate color information, such as color statistics, contrast statistics, and/or any other suitable color information.

Note that, in some embodiments, any of the quality metrics can be calculated as corresponding to a particular format or resolution of the video. In some such embodiments, a group of quality metrics can be indicated for each of format or resolution in a group of formats or resolutions. In some embodiments, the group of formats or resolutions can include any suitable formats or resolutions, such as 240p, 360p, 480p, 720p, 1080p, 2160p, and/or any other suitable formats or resolutions.

In some embodiments, each segment of the video can be of any suitable duration (e.g., one second, four seconds, ten seconds, and/or any other suitable duration). In some embodiments, a quality metric can be calculated for any portion of a segment or of the video. For example, in some embodiments, a quality metric can be calculated for an entire segment of the video. As another example, in some embodiments, a quality metric can be calculated for a portion of a segment that precedes or succeeds a boundary between two segments. In some such embodiments, the portion of the segment that precedes or succeeds the boundary between two segments can be of any suitable duration (e.g., half a second, one second, and/or any other suitable duration) and/or any suitable number of frames of the video (e.g., one frame, five frames, ten frames, and/or any other suitable number of frames). As yet another example, in some embodiments, a quality metric can be calculated for an entire video.

In some embodiments, the quality metrics can be indicated in any suitable manner. For example, in an instance in which a particular quality metric (e.g., a video quality metric, sensor metadata, analysis metadata, and/or any other suitable quality metric) is associated with a particular segment or portion of a segment of the video, the quality metric can be indicated in connection with an indication of the duration of the video (e.g., 1:00-1:04, 2:02-2:05, and/or any other suitable video duration or portion) for which the quality metric applies. Note that, in some embodiments, the quality metrics can additionally be indicated as corresponding to particular formats or resolutions. For example, values for a particular Metric A can be indicated for a group of resolutions {240p, 360p, 480p, 720p, 1080p, 1440p, 2160p} as {0.1, 0.15, 0.2, 0.23, 0.5, 0.7, 0.9} for a particular segment or portion of a segment of the video. Continuing further with this example, values of Metric A for each of the resolutions in the group of resolutions can be indicated for any other segments or portions of segments of the video. Note that, in some embodiments, changes in a particular metric for a particular format or resolution between segments or portions of segment can be indicated as differences. For example, in an instance in which the values of Metric A given above correspond to a first segment of the video, values of Metric A for a second segment of the video can be indicated as: {−0.02, +0.3, −0.12, +0.02, −0.05, −0.07, −0.1}, indicating that, for example, a value of Metric A for a resolution of 240p has decreased by 0.02 between the first segment of the video and the second segment of the video.

In some embodiments, each difference in quality metric value (e.g., between two segments of a video) can be indicated in connection with a Just Noticeable Difference (JND) that indicates a change in the quality metric value required for the difference in the quality metric value to be perceived by a viewer of the video. For example, continuing with the example changes in Metric A for a group of resolutions of {−0.02, +0.3, −0.12, +0.02, −0.05, −0.07, −0.1}, a group of JNDs can be indicated, such as: {0.1, 0.1, 0.1, 0.2, 0.2, 0.3, 0.3,} that indicate that a difference of 0.1 in Metric A is required for a resolution of 240p for a viewer to perceive a difference in Metric A when the video is presented at 240p, and that a difference of 0.3 in Metric A is required for a resolution of 2160p for a viewer to perceive a difference in Metric A when the video is presented at 2160p.

In some embodiments, JNDs for a particular quality metric can be the same for different resolutions, or can be different for different resolutions (as in the example given above). In some embodiments, JNDs for a particular quality metric can be different for different types of user devices and/or for different viewing conditions. For example, in some embodiments, Metric A can have a first JND (e.g., 0.01, 0.1, and/or any other suitable value) for a television, and a second JND (e.g., 0.3, 0.4, and/or any other suitable value) for a mobile phone. As another example, in some embodiments, a JND for a particular quality metric can depend on a size of a display of the user device, based on a viewport size being used to view the video content item, and/or any other suitable information. Note that, in some embodiments, JNDs can be specified for different ranges of a quality metric value. For example, in some embodiments, a JND for Metric A can be indicated as 0.1 when Metric A is between 0 and 0.5, and 0.2 when Metric A is between 0.5 and 1.

In some embodiments, the quality metrics can be indicated in any suitable format. For example, in some embodiments, groups of quality metrics, corresponding to different formats or resolutions and for different segments of a video, as well as the corresponding JNDs, can be included in a manifest file that is transmitted by the server to the user device. Note that, in some embodiments, information corresponding to any suitable number of quality metrics (e.g., one, two, five, ten, twenty, and/or any other suitable number) can be included in the manifest file.

At 106, process 100 can select a first format for a first segment of the video. In some embodiments, process 100 can select the first format for the first segment of the video based on any suitable information. For example, in some embodiments, process 100 can select the first format for the first segment of the video based on network information and/or user device information that indicates a current state of a network connection of the user device and/or a current state of the user device. As a more particular example, in some embodiments, process 100 can select the first format based on values for one or more quality metrics corresponding to the first segment of the video and based on the network information and/or device information. As a specific example, in some embodiments, in an instance in which process 100 determines that the current network connection is of relatively high quality or speed, process 100 can select the first format as the highest resolution. As another specific example, in some embodiments, in an instance in which process 100 determines that the current network connection is of a relatively poor quality or slow speed, process 100 can select a format from a group of relatively low resolution formats based on the quality metric values for the relatively low resolution formats. As another more particular example, in some embodiments, process 100 can select the first format for the first segment of the video based on user device information, such as a model or type of user device (e.g., that the user device is a mobile phone, that the user device is a virtual assistant device, that the user device is a television, and/or any other suitable type of user device), a size of a display of the user device, a size of a current viewport through which the video is to be presented on the user device, and/or any other suitable user device information.

As another example, in some embodiments, process 100 can select the first format for the first segment of the video by using any of the quality metrics corresponding to the first segment, network information, and/or device information as input features to a trained model. As a more particular example, in some embodiments, the trained model can output quality scores for a group of available formats or resolutions, and process 100 can select the format or the resolution with the highest quality score. Note that, in some embodiments, a particular quality score generated as an output by a trained model for a particular format or resolution of the video can indicate a predicted quality in any suitable manner. For example, in some embodiments, the quality score can indicate a likelihood that the video, if streamed at the particular format or resolution with the current network connection, will need to be re-buffered. As another example, in some embodiments, the quality score can indicate a likelihood a viewer of the video, if the video is viewed at the particular format or resolution, will continue watching the video for a particular duration of time (e.g., for more than 50% of the video, for more than 80% of the video, for more than five minutes, for more than ten minutes, and/or for any other suitable duration of time). As yet another example, in some embodiments, the quality score can indicate a likelihood that a viewer of the video, if viewer at the particular format or resolution, will select another video for viewing after finishing the current video. As still another example, in some embodiments, the quality score can indicate a predicted rating of a viewer of the video if viewed at the particular format or resolution.

In some embodiments, in an instance in which process 100 selects the first format for the first segment of the video using a trained model, process 100 can receive parameters for the trained model in any suitable manner. For example, in some embodiments, process 100 can receive parameters corresponding to the trained model from the server that hosts the video. Note that, in some embodiments, process 100 can receive the parameters corresponding to the trained model in connection with an application used to present the video. Additional details describing techniques for training models that can be used by a user device to select a format for a segment of a video are shown in and described below in connection with FIG. 2.

At 108, process 100 can request, from the server that hosts the video, the first segment of the video with the selected first format. In some embodiments, process 100 can transmit an indication of the selected first format to the server.

At 110, process 100 can receive the first segment having the first format from the server and can begin presenting the first segment with the first format on the user device. In some embodiments, process 100 can present the first segment of the video on the user device in any suitable manner. For example, in some embodiments, process 100 can present the first segment of the video using an application executing on the user device (e.g., an application associated with a video content streaming service that provides the video, an application associated with a service in which the video is embedded, and/or any other suitable application). As another example, in some embodiments, process 100 can present the first segment of the video within a video player window that includes any suitable controls, such as fast-forward and rewind controls, volume adjustment controls, and/or any other suitable controls.

At 112, process 100 can determine updated user device information and updated network information. For example, in some embodiments, process 100 can identify any changes in the network connection used to stream the video, such as that the network connection has become slower, has a longer latency, and/or has a smaller bandwidth since a time the network information was determined at block 106, that the network connection has become faster, has a shorter latency, and/or has a larger bandwidth since a time the network information was determined at block 106, and/or any other suitable change in the network connection. As another example, in some embodiments, process 100 can identify changes in the device state since the device state was determined at block 106, such as that a viewport used to view the video has changed in size (e.g., become bigger, become smaller, and/or any other suitable size change), that the user device is running low on battery, that the user device has been plugged in to a power source, and/or any other suitable device state change information.

At 114, process 100 can identify a potential second format for a second segment of the video. In some embodiments, process 100 can identify the potential second format in any suitable manner. For example, in some embodiments, process 100 can identify a potential second format based on a manner in which a user device state and/or a quality of the network connection has changed, as determined at block 112. As a more particular example, in some embodiments, process 100 can identify a potential second format based on a determination that a size of the viewport used to view the video on the user device has changed by more than a predetermined threshold. As another more particular example, in some embodiments, process 100 can identify the second format based on a determination that a quality of the network connection (e.g., a speed of the network connection, a latency of the network connection, a bandwidth of the network connection, and/or any other suitable quality metric) has changed by more than a predetermined threshold. As a specific example, in an instance in which a quality of the network connection has increased, process 100 can identify a second format that has a relatively higher resolution than the first format. Continuing further with this example, in an instance in which a current resolution of the video is 480p, process 100 can identify a second format with a relatively increased resolution, such as 720p, 1080p, and/or any other suitable increased resolution. Conversely, in an instance in which a quality of the network connection has decreased, process 100 can identify a second format that has a relatively lower resolution than the first format. Continuing further with this example, in an instance in which a current resolution of the video is 1080p, process 100 can identify a second format with a relatively decreased resolution, such as 720p, 480p, and/or any other suitable decreased resolution.

In some embodiments, process 100 can identify the second potential format by using the video quality metrics received at block 104, the updated user device information determined at block 112, and/or the updated network information determined at block 112 as input features to a trained model that outputs scores for different potential formats. For example, in some embodiments, the trained model can output a quality score for each of a group of formats for the second segment that indicates quality in any suitable manner. As a more particular example, in some embodiments, the quality score can indicate a likelihood that the user will enjoy the second segment of the video if presented with the particular format, such as a predicted user rating for the second segment, a predicted likelihood the user will watch a predetermined duration of the video if presented with the particular format, a predicted likelihood the user will watch another video if the video is presented with the particular format, and/or any other suitable output. As another more particular example, in some embodiments, the quality score can indicate a likelihood that the video will be paused to re-buffer if presented at the particular format.

In some embodiments, the trained model can generate a group of quality scores, each corresponding to a different format or resolution for the second segment of the video. For example, the trained model can generate a group of quality scores such as: {0.2, 0.3, 0.33, 0.4, 0.42, 0.7, 0.71} for a group of resolutions of {240p, 360p, 480p, 720p, 1080p, 1440p, 2160p}. In some embodiments, process 100 can then identify the potential second format based on the group of quality scores in any suitable manner. For example, in some embodiments, process 100 can identify the potential second format as the potential second format with the highest predicted quality score. As another example, in some embodiments, process 100 can identify the potential second format as the potential second format closest to the current first format with the highest predicted quality score. As a more particular example, in an instance in which a current resolution is 720p, and using the group of quality scores given above as an example, process 100 can determine that the two potential formats closest to 720p are 480p (with a quality score of 0.33), and 1080p (with a quality score of 0.42). Continuing further with this particular example, process 100 can then select 1080p as the potential second format.

Note that, additional details describing models for generating quality scores for different video formats are described below in connection with FIG. 2.

At 116, process 100 can determine whether the format of the video is to be changed from the first format to the second potential format during presentation of the second segment of the video. In some embodiments, process 100 can determine whether the format of the video is to be changed at any suitable time. For example, in some embodiments, process 100 can determine whether the format of the video is to be changed in response to determining that less than a predetermined duration (e.g., less than one second, less than two seconds, and/or any other suitable duration) of the first segment of the video remains to be presented. As another example, in some embodiments, process 100 can determine whether the format of the video is to be changed in response to determining that less than a predetermined amount of video data corresponding to the video remains in a buffer of the user device.

In some embodiments, process 100 can determine whether the format of the video is to be changed to the potential second format in any suitable manner. For example, in some embodiments, process 100 can determine whether the format of the video is to be changed to the potential second format by using the video quality metrics received at block 104, the updated user device information determined at block 112, and/or the updated network information determined at block 112 as input features to a trained model that generates, as an output, a flag that indicates whether format is to be changed or not. In some embodiments, the trained model can additionally take as input features the first format of the video and the potential second format of the video. For example, in some embodiments, in an instance in which process 100 identified a potential second format that has an increased resolution relative to the first format because a quality of the network connection has increased, the trained model can take as inputs indications of both the first format and the potential second format with the increased resolution. As another example, in an instance in which process 100 identified a potential second format that has a decreased resolution relative to the first format because a quality of the network connection has decreased, the trained model can take as inputs indications of both the first format and the potential second format with the decreased resolution. Note that additional details describing a model that generates an output that indicates whether or not a format of the video is to be changed in shown in and described below in connection with block 210 of FIG. 2.

As another example, in some embodiments, process 100 can determine whether the format of the video to the potential second format based on JNDs associated with one or more of the video quality metrics (e.g., as described above in connection with block 104) between the first segment and the second segment and for the first format and the potential second format. As a more particular example, a particular Metric A can have values of [0.2, 0.3] for the first format for the first segment and the second segment, and values of [0.4, 0.7] for the potential second format for the first segment and the second segment. Continuing further with this example, Metric A can have a JND of 0.1, which indicates that a difference in Metric A of less than 0.1 between two segments will not be perceptible by a viewer. Continuing still further with this example, process 100 can determine that, with respect to Metric A, there is a difference of 0.1 (i.e., 0.3-0.2) if the first format is used for the second segment, and a difference of 0.5 (i.e., 0.7-0.2) if the format is changed to the potential second format. In some embodiments, process 100 can therefore determine that because the difference with respect to Metric A is larger in switching to the potential second format, and the difference is larger than the JND, the format is to be changed to the potential second format.

Conversely, as another more particular example, a particular Metric B can have values of [0.2, 0.21] for the first format for the first segment and the second segment, and values of [0.2, 0.22] for the potential second format for the first segment and the second segment. Continuing further with this example, Metric B can have a JND of 0.1, which indicates that a difference in Metric B of less than 0.1 between two segments will not be perceptible by a viewer. Continuing still further with this example, process 100 can determine that, with respect to Metric B, there is a difference of 0.01 (i.e., 0.21-0.2) if the first format is used for the second segment, and a difference of 0.02 (i.e., 0.22-0.2) if the format is changed to the potential second format. In some embodiments, process 100 can therefore determine that because the difference with respect to Metric B is less than the JND, even though the values for Metric B are higher with the potential second format, the format is not to be changed to the potential second format.

Note that, in some embodiments, process 100 can use JNDs for any suitable number of video quality metrics to determine whether the format is to be changed to the potential second format. For example, in some embodiments, process 100 can select a particular video quality metric (e.g., PSNR, SSIM, VAMF, sensor metadata that indicates motion of a camera during video capture, analysis metadata that indicates color statistics, and/or any other suitable quality metric, such as described above in connection with block 104) that is to be used to determine whether the format is to be changed. In some embodiments, process 100 can select the quality metric based on a genre of the video. For example, process 100 can be configured to select a first quality metric in response to determining that the video is a music video, and a second quality metric in response to determining that the video is a documentary. In some embodiments, process 100 can select the quality metric based on a type of device associated with the user device presenting the video. For example, process 100 can be configured to select a first quality metric in response to determining that the user device is a mobile phone, and a second quality metric in response to determining that the user device is a smart television. As another example, in some embodiments, process 100 can select the quality metric based on a screen size of a display of the user device presenting the video. Additionally, note that in some embodiments, process 100 can use JNDs for multiple video quality metrics, and can combine the JND information in any suitable manner. For example, process 100 can determine that the format is to be changed if a difference in any of the quality metrics exceeds the corresponding JND. As another example, process 100 can determine that the format is to be changed if a difference in all of the quality metrics exceeds the corresponding JNDs.

Note that, in some embodiments, the JND information can be used to determine if the format is to be changed by a trained model that takes, as inputs, the JND information for each of the video quality metrics, as described below in connection with FIG. 2.

If, at 116, process 100 determines that the format of the video is not to be changed ("no" at 116), process 100 can proceed to block 118 and can request a second segment of the video having the first format from the server. Process 100 can then proceed to block 122 and can begin presenting the second segment of the video having the first format.

If, at 116, process 100 determines that the format of the video is to be changed ("yes" at 116), process 100 can proceed to block 120 and can request the second segment of the video having the second format identified at block 114 from the server. Process 100 can then proceed to block 122 and can begin presenting the second segment of the video having the second format.

Note that, in some embodiments, process 100 can use any other suitable trained models to determine any other suitable streaming parameters. For example, in some embodiments, process 100 can use a trained model to determine an amount of data to buffer during streaming of the video. As another example, in some embodiments, process 100 can use a trained model to predict a network bandwidth.

Turning to FIG. 2, an example 200 of a process for training models to select a format for a video and/or determine if a format is to be changed is shown in accordance with some embodiments of the disclosed subject matter. In some embodiments, blocks of process 200 can be executed by any suitable device. For example, in some embodiments, blocks of process 200 can be executed by a server, such as a server that hosts one of more video content items and streams video content items to user devices.

Process 200 can begin at 202 by receiving, for any suitable group of videos, information indicating features of the videos. As described above in connection with block 104 of FIG. 1, the video features can include any suitable video features that indicate a quality of the video at different segments of the video. For example, as described above in connection with block 104 of FIG. 1, the video features can include any suitable full reference or no reference video quality metrics (e.g., PSNR, SSIM, VAMF, and/or any other suitable metrics), information indicating sensor metadata of a camera during capture of the video (e.g., gyroscope data, GPS data, accelerometer data, and/or any other suitable sensor metadata), model information of the camera that captured the video, software version information of software used to edit the video, analysis metadata (e.g., that indicates color or contrast information of the video, motion vector data associated with the video, spatial or temporal activity within the video, and/or any other suitable analysis metadata). Note that, in some embodiments, process 200 can receive the video features from any suitable entity, for example, from any suitable other server, from an external database, and/or from any other suitable entity.

Note that, in some embodiments, similar to what is described above in connection with FIG. 1, in some embodiments, each video feature can be indicated in connection with timing information that indicates a segment of the video or a portion of a segment to which the video feature applies. Additionally, in some embodiments, video features can be calculated for different video formats or resolutions. Furthermore, in some embodiments, some or all of the video features can be associated with JNDs that indicate a minimum difference in the video feature value between two segments required for the difference in the video feature to be perceptible to a viewer of the video, as described above in connection with block 104 of FIG. 1.

Additionally, note that, in some embodiments, the group of videos can include any suitable videos and any suitable number (e.g., one hundred, one thousand, ten thousand, and/or any other suitable number) of videos. In some embodiments, the group of videos can be limited to videos of a particular topic or genre (e.g., music videos, documentaries, television shows, full-length movies, and/or any other suitable type of topic or genre).

At 204, process 200 can receive viewing information for a plurality of users who have viewed videos in the group of videos on a plurality of user devices. In some embodiments, the viewing information can include any suitable information, such as time or date information that indicates a time or date the user viewed a particular video, user device information associated with the user device used to view the video (e.g., a model or type of the user device, a size of a screen or display associated with the user device, a name or type of application executing on the user device via which the video was presented, a viewport size through which the video was presented, and/or any other suitable user device information), and/or network information associated with the network connection used to stream the video (e.g., a type of network connection, a speed of the network connection, a latency of the network connection, a bandwidth of the network connection, and/or any other suitable network connection information). In some embodiments, the viewing information can additionally indicate any suitable information that explicitly or implicitly indicates a quality of the viewing experience. For example, in some embodiments, the viewing information can indicate whether the viewer viewed the entire video or most of the video, whether the video was paused to re-buffer on the user device, whether the user selected other videos to view within the same viewing session, whether the user shared or endorsed the video, and/or any other suitable viewing quality information.

In some embodiments, process 200 can receive the viewing information in any suitable manner. For example, in some embodiments, process 200 can query a database that logs viewership information associated with different videos to retrieve viewing information for the videos in the group of videos. In some embodiments, process 200 can retrieve viewing information for the videos over any suitable time period (e.g., within the past week, within the past month, and/or over any other suitable time period).

Blocks 206, 208, and 210 describe three different models that can be trained by process 200 using the video features and the viewing information as input features. In some embodiments, process 200 can train any or all of the different models. Note that, in some embodiments, process 200 can generate training sets for each of the different models using the video features and the viewing information received at blocks 202 and 204, as described above. Additionally, note that, in some embodiments, each model can be any suitable type of machine learning model (e.g., a random forest, a neural network, a decision tree, a naïve Bayes model, a logistic regression, and/or any other suitable type of model). In some embodiments, the model can be trained using any suitable optimizer, any suitable learning rate, and/or any other suitable parameters.

At 206, process 200 can train a first model that generates, as an output, quality scores for a group of potential video formats for the video for a particular segment of the video. Similar to what is described in connection with FIG. 1, in some embodiments, the group of potential video formats can include any suitable video resolutions, such as 240p, 360p, 480p, 720p, 1080p, 1440p, 2160p, and/or any other suitable resolutions.

In some embodiments, the first model can take any suitable inputs, such as any suitable video features for the particular segment of a particular video included in the group of videos (e.g., as described above in connection with block 202) and/or any suitable viewing information that indicates information associated with a user device used to view the video and/or network information associated with a network connection used to stream the video. In some embodiments, the first model can then generate, for the group of input features and for each potential format in the group of formats, a quality score that indicates a quality of presenting the segment of the video with the corresponding format on a user device having the user device characteristics included in the input features and streamed via a network connection included in the input features. For example, for a group of potential formats of: {240p, 360p, 480p, 720p, 1080p, 1440p, 2160p} and for an input that includes: {Video Segment Features, User Device Characteristics, Network Connection Characteristics}, the first model can generate quality scores such as: {0.1, 0.2, 0.5, 0.7, 0.65, 0.4, 0.3}, indicating that the resolution of 720p has the highest predicted quality score for the given video segment features, user device characteristics, and network connection characteristics. Note that, a particular quality score can indicate quality of the viewing experience in any suitable manner, such as a likelihood the user will enjoy the video, a likelihood the user will rate the viewing experience positively, and/or any other suitable quality experience.

At 208, process 200 can train a second model that generates, as an output, a predicted viewership score of a particular video included in the group of videos when presented with a particular format. In some embodiments, the viewership score can correspond to any suitable implicit indication of a likelihood that a user will enjoy the video when presented with the particular format, such as a predicted duration of time the user will view the video when presented at the particular format, a predicted number of other videos the user will view within a viewing session after viewing the particular video, a predicted number of times the video will be re-buffered if presented at the particular format, and/or any other suitable viewership information.

In some embodiments, the second model can take any suitable inputs, such as any suitable video features for any of the segments of the video (e.g., as described above in connection with block 202) and/or any suitable viewing information indicating information associated with a user device used to view the video and/or network information associated with a network connection used to stream the video. In some embodiments, the second model can additionally take, as an input, an indication of a particular video format. In some embodiments, the second model can then generate, for the group of input features and for the particular video format, a viewership score, as described above. Note that, although the second model is described as generating a viewership score for a particular video format, in some embodiments, the second model can be configured to generate a group of viewership scores for a group of video formats, similar to what is described above in connection with the first model described above in connection with block 206.

At 210, process 200 can train a third model that generates, as an output, a decision of whether a video that is currently being presented with a first format is to be switched to a potential second format. In some embodiments, the third model can take any suitable inputs, such as any suitable video features for any of the segments of the video (e.g., as described above in connection with block 202) and/or any suitable viewing information indicating information associated with a user device used to view the video and/or network information associated with a network connection used to stream the video. In some embodiments, the third model can additionally take as inputs indications of the current first format and an indication of a potential second format. In some embodiments, the third model can then generate an output that represents a decision of whether the format of the video is to be changed from the first format to the potential second format, or whether the format should remain the first format.

Note that, in some embodiments, video feature information used as inputs for any of the first model, the second model, and/or the third model can include JND information that indicates a minimum difference between two segments of a video with respect to a particular video feature for the difference to be perceptible to a viewer of the video segments. In some embodiments, the JND information can be included in connection with video features used as inputs during training of the model (e.g., as part of a training sample that includes a video feature and a corresponding JND), and/or video features used as inputs during an inference phase of an already-trained model.

At 212, process 200 can transmit at least one of the first model, the second model, and/or the third model to a user device. In some embodiments, process 200 can transmit any of the first model, the second model, and/or the third model to the user device at any suitable time(s). For example, in some embodiments, process 200 can transmit a model in connection with an application executing on the user device that is used to stream videos on the user device. Note that, in some embodiments, in an instance in which a transmitted model is later updated by process 200 (e.g., based on updated viewing information, based on updated video features, and/or updated in any other suitable manner), process 200 can transmit an updated model to the user device.

In some embodiments, the user device can then use any of the transmitted models to select a first format for a video (e.g., as described above in connection with block 106 of FIG. 1), identify a potential second format of a video being presented on the user device (e.g., as described above in connection with block 114 of FIG. 1), and/or determine whether the first format is to be changed to the potential second format (e.g., as described above in connection with block 116 of FIG. 1).

Note that, in some embodiments, in an instance in which a server selects formats for a video content item and/or determines whether a format with which a video content item is being streamed to a user device is to be switched (e.g., as shown in and described below in connection with FIG. 5), block 212 of process 200 can be omitted. In some such embodiments, the server can store any trained models for use by process 500 of FIG. 5.

Figure 5:
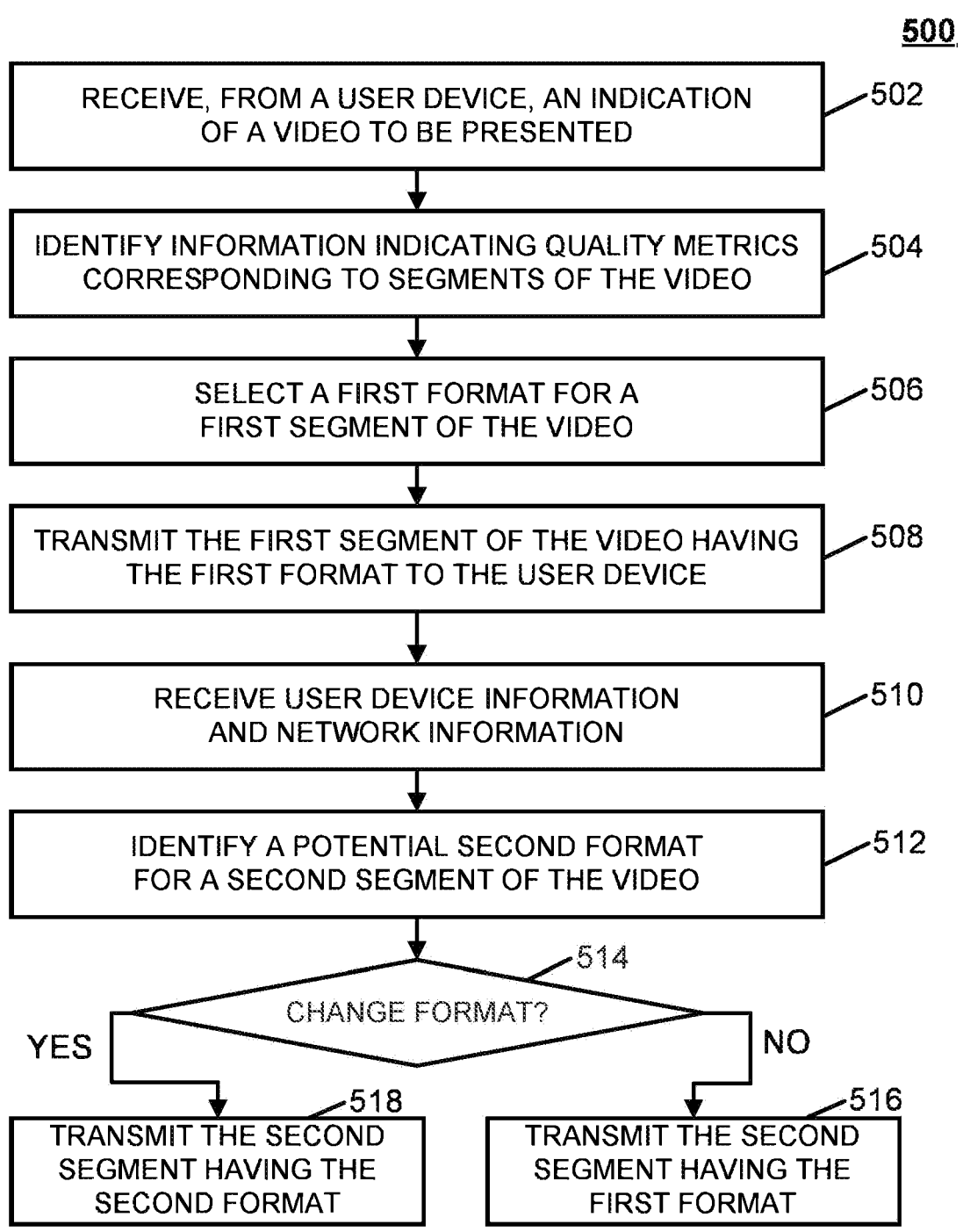
FIG. 5 shows an illustrative example of a process for selecting video formats for adaptive video streaming that can be implemented by a server in accordance with some embodiments of the disclosed subject matter.

Turning to FIG. 5, an illustrative example 500 of a process for selecting video formats for adaptive video streaming that can be implemented by a server is shown in accordance with some embodiments of the disclosed subject matter. In some embodiments, blocks of process 500 can be executed by any suitable server, such as a server associated with a video content streaming or sharing service that streams a video content item to a user device.

Process 500 can begin at 502 by receiving, from a user device, an indication of a video to be presented. In some embodiments, the indication can be received in any suitable manner. For example, in some embodiments, process 500 can receive a request from the user device, where the request includes an identifier of the video to be presented. Note that, as described above in connection with block 102 of FIG. 1, in some embodiments, the video can be selected on the user device in any suitable manner, such as via a user interface, and/or in any other suitable manner. Note that, in some embodiments, process 500 can additionally receive, from the user device, any suitable user device information and/or network information in connection with the request for the video. For example, in some embodiments, process 500 can receive user device information that indicates a current state of the user device (e.g., a model of the user device, a type of the user device, a current viewport size of the user device, a current battery level of the user device, and/or any other suitable user device information) and/or any suitable network information associated with a connection of the user device to a network used to stream the video (e.g., a type of network connection, a bandwidth of the network connection, a latency of the network connection, a speed of the network connection, and/or any other suitable information).

At 504, process 500 can identify information indicating quality metrics corresponding to segments of the video. In some embodiments, process 500 can identify the information indicating quality metrics corresponding to the segments of the video by retrieving the information indicating quality metrics from any suitable entity, such as from a server that hosts the video, a database associated with the server, and/or any other suitable entity.

As described above in connection with FIG. 1, in some embodiments, the quality metrics can indicate any suitable information. For example, in some embodiments, the quality metrics can include any suitable full reference or no reference metrics that indicate video quality, such as PSNR, SSIM, VMAF, and/or any other suitable video quality metric(s).

As another example, in some embodiments, the quality metrics can indicate metadata associated with the video associated with capture or editing of the video. As a more particular example, in some embodiments, the metadata can indicate equipment or software used to capture or edit the video, such as a model or type of camera used to capture the video, a name or version number of software used to edit the video, and/or any other suitable type of equipment or software information. As another more particular example, in some embodiments, the metadata can indicate motion information associated with the camera during capture of the video, such as gyroscope data from the camera during capture of the video, accelerometer data from an accelerometer of the camera during capture of the video, Global Positioning System (GPS) information associated with the camera during capture of the video, and/or any other suitable information that indicates motion of the camera during capture of the video. As yet another more particular example, in some embodiments, the metadata can indicate information generated from an analysis of the video after it has been captured. As a specific example, in some embodiments, the analysis metadata can indicate motion information (e.g., motion vector information, spatial activity, temporal activity, and/or any other suitable motion information determined as part of a post-capture analysis of the video). As another specific example, in some embodiments, the analysis metadata can indicate scene information (e.g., indications of detected objects, whether a particular scene includes faces or people, and/or any other suitable scene information). As yet another specific example, in some embodiments, the analysis metadata can indicate color information, such as color statistics, contrast statistics, and/or any other suitable color information.

Note that, in some embodiments, any of the quality metrics can be calculated as corresponding to a particular format or resolution of the video. In some such embodiments, a group of quality metrics can be indicated for each of format or resolution in a group of formats or resolutions. In some embodiments, the group of formats or resolutions can include any suitable formats or resolutions, such as 240p, 360p, 480p, 720p, 1080p, 1440p, 2160p, and/or any other suitable formats or resolutions.

In some embodiments, each segment of the video can be of any suitable duration (e.g., one second, four seconds, ten seconds, and/or any other suitable duration). In some embodiments, a quality metric can be calculated for any portion of a segment or of the video. For example, in some embodiments, a quality metric can be calculated for an entire segment of the video. As another example, in some embodiments, a quality metric can be calculated for a portion of a segment that precedes or succeeds a boundary between two segments. In some such embodiments, the portion of the segment that precedes or succeeds the boundary between two segments can be of any suitable duration (e.g., half a second, one second, and/or any other suitable duration) and/or any suitable number of frames of the video (e.g., one frame, five frames, ten frames, and/or any other suitable number of frames). As yet another example, in some embodiments, a quality metric can be calculated for an entire video.

In some embodiments, the quality metrics can be indicated in any suitable manner. For example, in an instance in which a particular quality metric (e.g., a video quality metric, sensor metadata, analysis metadata, and/or any other suitable quality metric) is associated with a particular segment or portion of a segment of the video, the quality metric can be indicated in connection with an indication of the duration of the video (e.g., 1:00-1:04, 2:02-2:05, and/or any other suitable video duration or portion) for which the quality metric applies. Note that, in some embodiments, the quality metrics can additionally be indicated as corresponding to particular formats or resolutions. For example, values for a particular Metric A can be indicated for a group of resolutions {240p, 360p, 480p, 720p, 1080p, 1440p, 2160p} as {0.1, 0.15, 0.2, 0.23, 0.5, 0.7, 0.9} for a particular segment or portion of a segment of the video. Continuing further with this example, values of Metric A for each of the resolutions in the group of resolutions can be indicated for any other segments or portions of segments of the video. Note that, in some embodiments, changes in a particular metric for a particular format or resolution between segments or portions of segment can be indicated as differences. For example, in an instance in which the values of Metric A given above correspond to a first segment of the video, values of Metric A for a second segment of the video can be indicated as: {−0.02, +0.3, −0.12, +0.02, −0.05, −0.07, −0.1}, indicating that, for example, a value of Metric A for a resolution of 240p has decreased by 0.02 between the first segment of the video and the second segment of the video.

In some embodiments, each difference in quality metric value (e.g., between two segments of a video) can be indicated in connection with a JND that indicates a change in the quality metric value required for the difference in the quality metric value to be perceived by a viewer of the video. For example, continuing with the example changes in Metric A for a group of resolutions of {−0.02, +0.3, −0.12, +0.02, −0.05, −0.07, −0.1}, a group of JNDs can be indicated, such as: {0.1, 0.1, 0.1, 0.2, 0.2, 0.3, 0.3,} that indicate that a difference of 0.1 in Metric A is required for a resolution of 240p for a viewer to perceive a difference in Metric A when the video is presented at 240p, and that a difference of 0.3 in Metric A is required for a resolution of 2160p for a viewer to perceive a difference in Metric A when the video is presented at 2160p.

In some embodiments, JNDs for a particular quality metric can be the same for different resolutions, or can be different for different resolutions (as in the example given above). In some embodiments, JNDs for a particular quality metric can be different for different types of user devices and/or for different viewing conditions. For example, in some embodiments, Metric A can have a first JND (e.g., 0.01, 0.1, and/or any other suitable value) for a television, and a second JND (e.g., 0.3, 0.4, and/or any other suitable value) for a mobile phone. As another example, in some embodiments, a JND for a particular quality metric can depend on a size of a display of the user device, based on a viewport size being used to view the video content item, and/or any other suitable information. Note that, in some embodiments, JNDs can be specified for different ranges of a quality metric value. For example, in some embodiments, a JND for Metric A can be indicated as 0.1 when Metric A is between 0 and 0.5, and 0.2 when Metric A is between 0.5 and 1.

At 506, process 500 can select a first format for a first segment of the video. In some embodiments, process 500 can select the first format for the first segment of the video based on any suitable information. For example, in some embodiments, process 500 can select the first format for the first segment of the video based on network information and/or user device information that indicates a current state of a network connection of the user device and/or a current state of the user device. As a more particular example, in some embodiments, process 500 can select the first format based on values for one or more quality metrics corresponding to the first segment of the video and based on the network information and/or device information. As a specific example, in some embodiments, in an instance in which process 500 determines that the current network connection is of relatively high quality or speed, process 500 can select the first format as the highest resolution. As another specific example, in some embodiments, in an instance in which process 500 determines that the current network connection is of a relatively poor quality or slow speed, process 500 can select a format from a group of relatively low resolution formats based on the quality metric values for the relatively low resolution formats. As another more particular example, in some embodiments, process 500 can select the first format for the first segment of the video based on user device information, such as a model or type of user device (e.g., that the user device is a mobile phone, that the user device is a virtual assistant device, that the user device is a television, and/or any other suitable type of user device), a size of a display of the user device, a size of a current viewport through which the video is to be presented on the user device, and/or any other suitable user device information.

As another example, in some embodiments, process 500 can select the first format for the first segment of the video by using any of the quality metrics corresponding to the first segment, network information, and/or device information as input features to a trained model. As a more particular example, in some embodiments, the trained model can output quality scores for a group of available formats or resolutions, and process 500 can select the format or the resolution with the highest quality score. Note that, in some embodiments, a particular quality score generated as an output by a trained model for a particular format or resolution of the video can indicate a predicted quality in any suitable manner. For example, in some embodiments, the quality score can indicate a likelihood that the video, if streamed at the particular format or resolution with the current network connection, will need to be re-buffered. As another example, in some embodiments, the quality score can indicate a likelihood a viewer of the video, if the video is viewed at the particular format or resolution, will continue watching the video for a particular duration of time (e.g., for more than 50% of the video, for more than 80% of the video, for more than five minutes, for more than ten minutes, and/or for any other suitable duration of time). As yet another example, in some embodiments, the quality score can indicate a likelihood that a viewer of the video, if viewer at the particular format or resolution, will select another video for viewing after finishing the current video. As still another example, in some embodiments, the quality score can indicate a predicted rating of a viewer of the video if viewed at the particular format or resolution.

Note that, additional details describing techniques for training models that can be used by a server to select a format for a segment of a video are shown in and described above in connection with FIG. 2.

At 508, process 500 can transmit the first segment having the first format to the user device for presentation by the user device.

At 510, process 500 can receive updated user device information and updated network information. For example, in some embodiments, process 500 can receive information that indicates any changes in the network connection used to stream the video, such as that the network connection has become slower, has a longer latency, and/or has a smaller bandwidth since a time the first segment was initially transmitted to the user device at block 508, that the network connection has become faster, has a shorter latency, and/or has a larger bandwidth since a time the first segment was initially transmitted to the user device at block 508, and/or any other suitable change in the network connection. As another example, in some embodiments, process 500 can identify changes in the device state since the first segment was initially transmitted to the user device at block 508, such as that a viewport used to view the video has changed in size (e.g., become bigger, become smaller, and/or any other suitable size change), that the user device is running low on battery, that the user device has been plugged in to a power source, and/or any other suitable device state change information.

At 512, process 500 can identify a potential second format for a second segment of the video. In some embodiments, process 500 can identify the potential second format in any suitable manner. For example, in some embodiments, process 500 can identify a potential second format based on a manner in which a user device state and/or a quality of the network connection has changed, as described above in connection with block 510. As a more particular example, in some embodiments, process 500 can identify a potential second format based on a determination that a size of the viewport used to view the video on the user device has changed by more than a predetermined threshold. As another more particular example, in some embodiments, process 500 can identify the second format based on a determination that a quality of the network connection (e.g., a speed of the network connection, a latency of the network connection, a bandwidth of the network connection, and/or any other suitable quality metric) has changed by more than a predetermined threshold. As a specific example, in an instance in which a quality of the network connection has increased, process 500 can identify a second format that has a relatively higher resolution than the first format. Continuing further with this example, in an instance in which a current resolution of the video is 480p, process 500 can identify a second format with a relatively increased resolution, such as 720p, 1080p, and/or any other suitable increased resolution. Conversely, in an instance in which a quality of the network connection has decreased, process 500 can identify a second format that has a relatively lower resolution than the first format. Continuing further with this example, in an instance in which a current resolution of the video is 1080p, process 500 can identify a second format with a relatively decreased resolution, such as 720p, 480p, and/or any other suitable decreased resolution.

In some embodiments, process 500 can identify the second potential format by using the video quality metrics identified at block 504, the updated user device information received at block 510, and/or the updated network information received at block 510 as input features to a trained model that outputs scores for different potential formats. For example, in some embodiments, the trained model can output a quality score for each of a group of formats for the second segment that indicates quality in any suitable manner. As a more particular example, in some embodiments, the quality score can indicate a likelihood that the user will enjoy the second segment of the video if presented with the particular format, such as a predicted user rating for the second segment, a predicted likelihood the user will watch a predetermined duration of the video if presented with the particular format, a predicted likelihood the user will watch another video if the video is presented with the particular format, and/or any other suitable output. As another more particular example, in some embodiments, the quality score can indicate a likelihood that the video will be paused to re-buffer if presented at the particular format.

In some embodiments, the trained model can generate a group of quality scores, each corresponding to a different format or resolution for the second segment of the video. For example, the trained model can generate a group of quality scores such as: {0.2, 0.3, 0.33, 0.4, 0.42, 0.7, 0.71} for a group of resolutions of {240p, 360p, 480p, 720p, 1080p, 1440p, 2160p}. In some embodiments, process 500 can then identify the potential second format based on the group of quality scores in any suitable manner. For example, in some embodiments, process 500 can identify the potential second format as the potential second format with the highest predicted quality score. As another example, in some embodiments, process 500 can identify the potential second format as the potential second format closest to the current first format with the highest predicted quality score. As a more particular example, in an instance in which a current resolution is 720p, and using the group of quality scores given above as an example, process 500 can determine that the two potential formats closest to 720p are 480p (with a quality score of 0.33), and 1080p (with a quality score of 0.42). Continuing further with this particular example, process 500 can then select 1080p as the potential second format.

Note that, additional details describing models for generating quality scores for different video formats are described above in connection with FIG. 2.

At 514, process 500 can determine whether the format of the video is to be changed from the first format to the second potential format during presentation of the second segment of the video. In some embodiments, process 500 can determine whether the format of the video is to be changed at any suitable time. For example, in some embodiments, process 500 can determine whether the format of the video is to be changed in response to determining that less than a predetermined duration (e.g., less than one second, less than two seconds, and/or any other suitable duration) of the first segment of the video remains to be presented by the first user device. As another example, in some embodiments, process 500 can determine whether the format of the video is to be changed in response to determining that less than a predetermined amount of video data corresponding to the video remains in a buffer of the user device. As yet another example, in some embodiments, process 500 can determine whether the format of the video is to be changed in response to determining that more than a predetermined duration of time has elapsed since the first segment was initially transmitted to the user device at block 508.

In some embodiments, process 500 can determine whether the format of the video is to be changed to the potential second format in any suitable manner. For example, in some embodiments, process 500 can determine whether the format of the video is to be changed to the potential second format by using the video quality metrics identified at block 504, the updated user device information received at block 510, and/or the updated network information received at block 510 as input features to a trained model that generates, as an output, a flag that indicates whether format is to be changed or not. In some embodiments, the trained model can additionally take as input features the first format of the video and the potential second format of the video. For example, in some embodiments, in an instance in which process 500 identified a potential second format that has an increased resolution relative to the first format because a quality of the network connection has increased, the trained model can take as inputs indications of both the first format and the potential second format with the increased resolution. As another example, in an instance in which process 500 identified a potential second format that has a decreased resolution relative to the first format because a quality of the network connection has decreased, the trained model can take as inputs indications of both the first format and the potential second format with the decreased resolution. Note that additional details describing a model that generates an output that indicates whether or not a format of the video is to be changed in shown in and described above in connection with block 210 of FIG. 2.

As another example, in some embodiments, process 500 can determine whether the format of the video is to be changed to the potential second format based on JNDs associated with one or more of the video quality metrics (e.g., as described above in connection with block 504) between the first segment and the second segment and for the first format and the potential second format. As a more particular example, a particular Metric A can have values of [0.2, 0.3] for the first format for the first segment and the second segment, and values of [0.4, 0.7] for the potential second format for the first segment and the second segment. Continuing further with this example, Metric A can have a JND of 0.1, which indicates that a difference in Metric A of less than 0.1 between two segments will not be perceptible by a viewer. Continuing still further with this example, process 500 can determine that, with respect to Metric A, there is a difference of 0.1 (i.e., 0.3-0.2) if the first format is used for the second segment, and a difference of 0.5 (i.e., 0.7-0.2) if the format is changed to the potential second format. In some embodiments, process 500 can therefore determine that because the difference with respect to Metric A is larger in switching to the potential second format, and the difference is larger than the JND, the format is to be changed to the potential second format.

Conversely, as another more particular example, a particular Metric B can have values of [0.2, 0.21] for the first format for the first segment and the second segment, and values of [0.2, 0.22] for the potential second format for the first segment and the second segment. Continuing further with this example, Metric B can have a JND of 0.1, which indicates that a difference in Metric B of less than 0.1 between two segments will not be perceptible by a viewer. Continuing still further with this example, process 500 can determine that, with respect to Metric B, there is a difference of 0.01 (i.e., 0.21-0.2) if the first format is used for the second segment, and a difference of 0.02 (i.e., 0.22-0.2) if the format is changed to the potential second format. In some embodiments, process 500 can therefore determine that because the difference with respect to Metric B is less than the JND, even though the values for Metric B are higher with the potential second format, the format is not to be changed to the potential second format.

Note that, in some embodiments, process 500 can use JNDs for any suitable number of video quality metrics to determine whether the format is to be changed to the potential second format. For example, in some embodiments, process 500 can select a particular video quality metric (e.g., PSNR, SSIM, VAMF, sensor metadata that indicates motion of a camera during video capture, analysis metadata that indicates color statistics, and/or any other suitable quality metric, such as described above in connection with block 504) that is to be used to determine whether the format is to be changed. In some embodiments, process 500 can select the quality metric based on a genre of the video. For example, process 500 can be configured to select a first quality metric in response to determining that the video is a music video, and a second quality metric in response to determining that the video is a documentary. In some embodiments, process 500 can select the quality metric based on a type of device associated with the user device presenting the video. For example, process 500 can be configured to select a first quality metric in response to determining that the user device is a mobile phone, and a second quality metric in response to determining that the user device is a smart television. As another example, in some embodiments, process 500 can select the quality metric based on a screen size of a display of the user device presenting the video. Additionally, note that in some embodiments, process 500 can use JNDs for multiple video quality metrics, and can combine the JND information in any suitable manner. For example, process 500 can determine that the format is to be changed if a difference in any of the quality metrics exceeds the corresponding JND. As another example, process 500 can determine that the format is to be changed if a difference in all of the quality metrics exceeds the corresponding JNDs.

Note that, in some embodiments, the JND information can be used to determine if the format is to be changed by a trained model that takes, as inputs, the JND information for each of the video quality metrics, as described above in connection with FIG. 2.

If, at 514, process 500 determines that the format of the video is not to be changed ("no" at 514), process 500 can proceed to block 516 and can transmit a second segment of the video having the first format to the user device.

If, at 514, process 500 determines that the format of the video is to be changed ("yes" at 514), process 500 can proceed to block 518 and can transmit the second segment of the video having the second format identified at block 512 to the user device.

Note that, in some embodiments, process 500 can use any other suitable trained models to determine any other suitable streaming parameters. For example, in some embodiments, process 500 can use a trained model to predict a network bandwidth.

Figure 3:
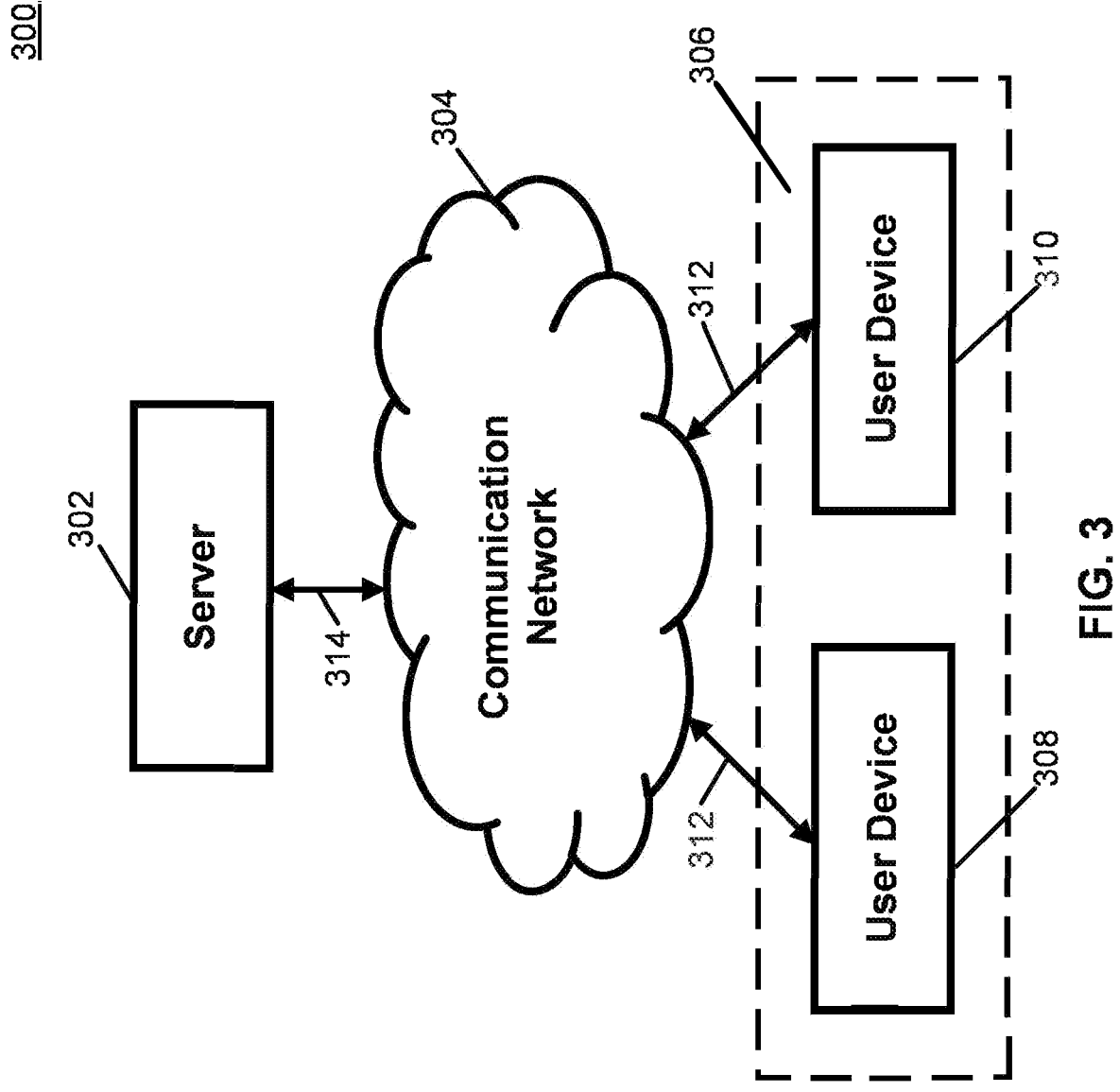
FIG. 3 shows a schematic diagram of an illustrative system suitable for implementation of mechanisms described herein for selecting video formats for adaptive video streaming in accordance with some embodiments of the disclosed subject matter.

Turning to FIG. 3, an illustrative example 300 of hardware for selecting video formats for adaptive video streaming that can be used in accordance with some embodiments of the disclosed subject matter is shown. As illustrated, hardware 300 can include a server 302, a communication network 304, and/or one or more user devices 306, such as user devices 308 and 310.

Server 302 can be any suitable server(s) for storing information, data, programs, media content, and/or any other suitable content. In some embodiments, server 302 can perform any suitable function(s). For example, in some embodiments, server 302 can transmit video content to a user device, such as one of user devices 306. As a more particular example, in some embodiments, server 302 can stream video content to a user device in response to a request for the video content. As another example, in some embodiments, server 302 can train one or more models that can be used by a user device to determine whether a format of a video content item is to be switched to a different format, to select a format of a video content item, and/or to determine any other suitable information, such as shown in and described above in connection with FIGS. 1 and 2. As yet another example, in some embodiments, sever 302 can determine whether a format in which a video content item is being streamed to a user device is to be switched from a first format to a second format, such as shown in and described below in connection with FIG. 5.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links (e.g., communications links 312) to communication network 304 that can be linked via one or more communications links (e.g., communications links 314) to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices suitable for streaming media content from server 302. In some embodiments, user device 306 can include any suitable type of user device, such as mobile phones, tablet computers, wearable computers, laptop computers, desktop computers, smart televisions, media players, game consoles, vehicle information and/or entertainment systems, and/or any other suitable type of user device. In some embodiments, user devices 306 can begin streaming a video content item with a first format and can determine whether to continue streaming the video content item with the first format, as described above in connection with FIG. 1. In some embodiments, user devices 306 can identify a format with which a video content item is to be streamed using any suitable technique or combination of techniques, such as a trained model, as described above in connection with FIG. 1

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid over-complicating the figure, any suitable number of user devices, and/or any suitable types of user devices, can be used in some embodiments.

Figure 4:
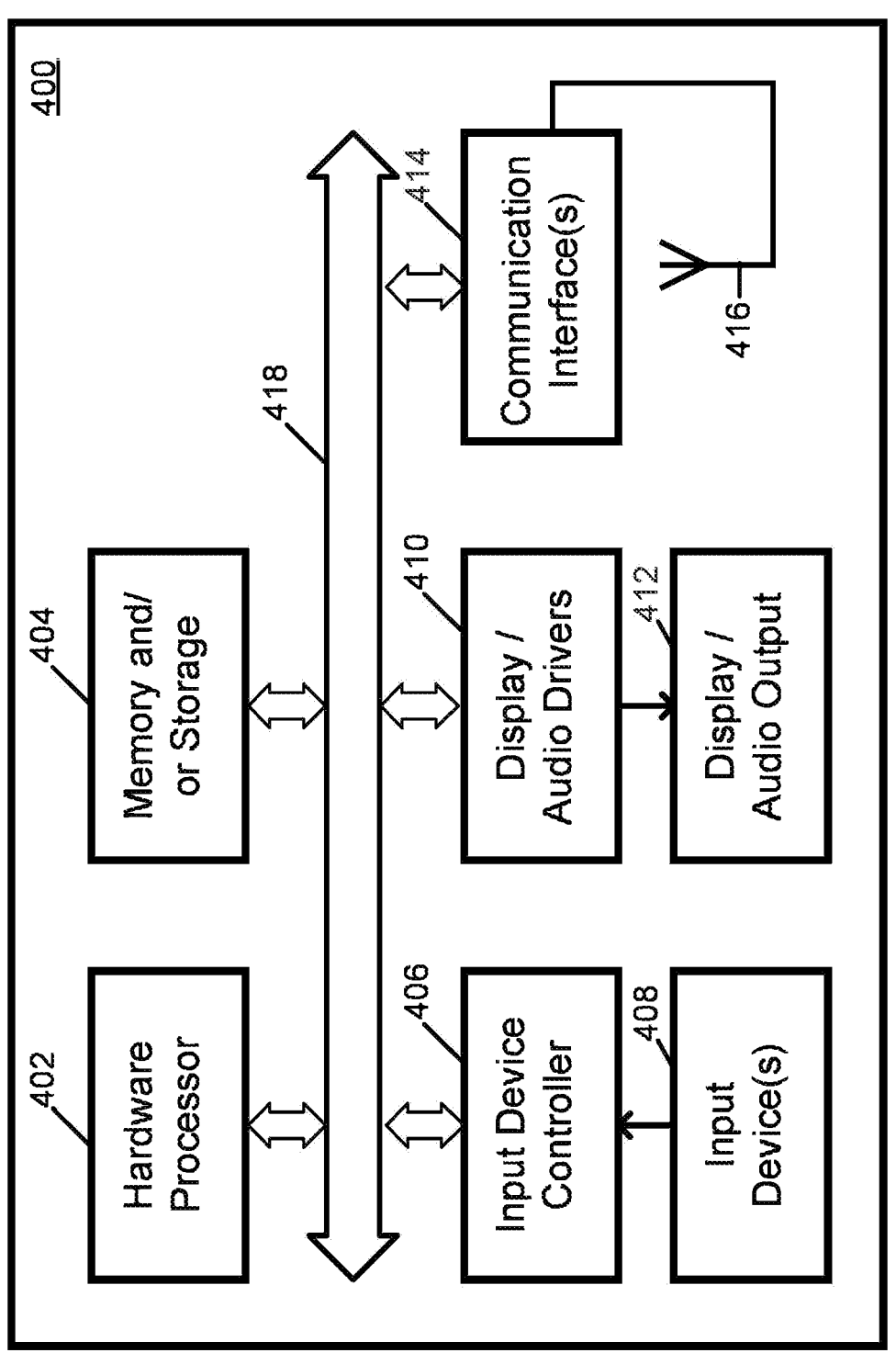
FIG. 4 shows a detailed example of hardware that can be used in a server and/or a user device of FIG. 3 in accordance with some embodiments of the disclosed subject matter.

Server 302 and user devices 306 can be implemented using any suitable hardware in some embodiments. For example, in some embodiments, devices 302 and 306 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 402 can be controlled by a server program stored in memory and/or storage of a server, such as server 302. In some embodiments, hardware processor 402 can be controlled by a computer program stored in memory and/or storage 404 of user device 306.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the processes of FIGS. 1, 2, and 5 can be executed or performed in any order or sequence not limited to the order and sequence shown in and described in connection with the figures. Also, some of the above blocks of FIGS. 1, 2, and 5 can be executed or performed substantially simultaneously where appropriate or in parallel to reduce latency and processing times. Additionally or alternatively, some of the above described blocks of the processes of FIGS. 1, 2, and 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), and/or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for selecting video formats for adaptive video streaming are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method to select video formats for adaptive video streaming, the method comprising:

receiving, at a server including a hardware processor, an indication of a first video to be presented on a user device of a user;

determining, at the server based on video features of the first video and one or more predicted viewership scores for the first video, a first format from a plurality of available formats for the first video, wherein the one or more predicted viewership scores indicate at least one of:

a predicted duration of time the user is to view the first video when the first video is presented to the user in the first format determined from the plurality of available formats for the first video, a predicted number of other videos the user is to view within a viewing session after viewing the first video in the first format determined from the plurality of available formats for the first video, or a predicted number of times the first video is to be re-buffered when presented in the first format determined from the plurality of available formats for the first video;

causing, at the server, the first video to be presented on the user device using the first format determined from the plurality of available formats for the first video;

identifying, at the server, a quality of a network connection between the user device and the server that hosts the first video during the presentation of the first video on the user device;

identifying, at the server, a second format for a second video based on the quality of the network connection; and causing, at the server, the second video to be presented by the user device using the second format.

2. The method of claim 1, wherein identifying the second format for the second video further comprises:

determining, at the server, whether a format of the second video is to be changed from the first format to the second format based on predicted viewership scores for the second video.

3. The method of claim 1, further comprising generating, by inputting the video features of the first video into a trained model, a group of quality metrics for each segment from a plurality of segments and for each format from the plurality of available formats for the first video.

4. The method of claim 3, wherein each quality metric for a subsequent segment of the first video corresponds to a difference between the quality metric for the subsequent segment and the quality metric for a preceding segment.

5. The method of claim 3, wherein the group of quality metrics includes data from a sensor of a camera used to capture the first video, wherein identifying the second format for the second video is further based on the data from the sensor of the camera, and wherein the data from the sensor includes motion information that indicates positioning of the camera during capture of the first video.

6. The method of claim 3, wherein the group of quality metrics includes analysis data from processing of the video after capture of the first video, wherein the analysis data includes activity information associated with content included in the first video.

7. The method of claim 3, wherein at least one quality metric in the group of quality metrics includes Just Noticeable Difference (JND) scores that indicate a minimum difference in a value of the quality metric from the first video to the second video that is perceptible to a viewer of the video, and wherein identifying the second format for the second video is further based on JND scores for the first format and the second format.

8. The method of claim 3, wherein identifying the second format for the second video comprises providing the group of quality metrics and the quality of the network connection as inputs to the trained model, and obtaining an output of the trained model, the output indicating that the format of the second video is to be changed from the first format to the second format.

9. A system to select video formats for adaptive video streaming, the system comprising:

a memory; and one or more processors, coupled to the memory, to perform operations comprising:

receiving an indication of a first video to be presented on a user device;

determining, based on video features of the first video and one or more predicted viewership scores for the first video, a first format from a plurality of available formats for the first video, wherein the one or more predicted viewership scores indicate at least one of:

a predicted duration of time the user is to view the first video when the first video is presented to the user in the first format determined from the plurality of available formats for the first video, a predicted number of other videos the user is to view within a viewing session after viewing the first video in the first format determined from the plurality of available formats for the first video, or a predicted number of times the first video is to be re-buffered when presented in the first format determined from the plurality of available formats for the first video;

causing the first video to be presented on the user device using the first format determined from the plurality of available formats for the first video;

identifying a quality of a network connection between the user device and a server that hosts the first video during the presentation of the first video on the user device;

identifying a second format for a second video based on the quality of the network connection; and causing the second video to be presented by the user device using the second format.

10. The system of claim 9, wherein identifying the second format for the second video further comprises:

determining whether a format of the second video is to be changed from the first format to the second format based on predicted viewership scores for the second video.

11. The system of claim 9, the operations further comprising generating, by inputting the video features of the first video into a trained model, a group of quality metrics for each segment from a plurality of segments and for each format from the plurality of available formats for the first video.

12. The system of claim 11, wherein each quality metric for a subsequent segment of the first video corresponds to a difference between the quality metric for the subsequent segment and the quality metric for a preceding segment.

13. The system of claim 11, wherein the group of quality metrics includes data from a sensor of a camera used to capture the first video, wherein identifying the second format for the second video is further based on the data from the sensor of the camera, and wherein the data from the sensor includes motion information that indicates positioning of the camera during capture of the first video.

14. The system of claim 11, wherein the group of quality metrics includes analysis data from processing of the video after capture of the first video, wherein the analysis data includes activity information associated with content included in the first video.

15. The system of claim 11, wherein identifying the second format for the second video comprises providing the group of quality metrics and the quality of the network connection as inputs to the trained model, and obtaining an output of the trained model, the output indicating that the format of the second video is to be changed from the first format to the second format.

16. A non-transitory computer-readable medium comprising instructions, which when executed by one or more processors, cause the one or more processors to perform operations comprising:

receiving an indication of a first video to be presented on a user device;

determining, based on video features of the first video and one or more predicted viewership scores for the first video, a first format from a plurality of available formats for the first video, wherein the one or more predicted viewership scores indicate at least one of:

a predicted duration of time the user is to view the first video when the first video is presented to the user in the first format determined from the plurality of available formats for the first video, a predicted number of other videos the user is to view within a viewing session after viewing the first video in the first format determined from the plurality of available formats for the first video, or a predicted number of times the first video is to be re-buffered when presented in the first format determined from the plurality of available formats for the first video;

causing the first video to be presented on the user device using the first format determined from the plurality of available formats for the first video;

identifying a quality of a network connection between the user device and a server that hosts the first video during the presentation of the first video on the user device;

identifying a second format for a second video based on the quality of the network connection; and causing the second video to be presented by the user device using the second format.

17. The non-transitory computer-readable medium of claim 16, wherein identifying the second format for the second video further comprises:

determining whether a format of the second video is to be changed from the first format to the second format based on predicted viewership scores for the second video.

18. The non-transitory computer-readable medium of claim 16, the operations further comprising generating, by inputting the video features of the first video into a trained model, a group of quality metrics for each segment from a plurality of segments and for each format from the plurality of available formats for the first video.

19. The non-transitory computer-readable medium of claim 18, wherein each quality metric for a subsequent segment of the first video corresponds to a difference between the quality metric for the subsequent segment and the quality metric for a preceding segment.

20. The non-transitory computer-readable medium of claim 18, wherein the group of quality metrics includes data from a sensor of a camera used to capture the first video, wherein identifying the second format for the second video is further based on the data from the sensor of the camera, and wherein the data from the sensor includes motion information that indicates positioning of the camera during capture of the first video.

* * * * *